United States Patent
Budihal

(10) Patent No.: US 9,485,416 B2
(45) Date of Patent: Nov. 1, 2016

(54) METHOD AND A GUIDED IMAGING UNIT FOR GUIDING A USER TO CAPTURE AN IMAGE

(71) Applicant: Wipro Limited, Bangalore (IN)

(72) Inventor: Ramachandra Budihal, Bangalore (IN)

(73) Assignee: Wipro Limited, Bangalore (IN)

(*) Notice: Subject to any disclaimer, the term of this patent is extended or adjusted under 35 U.S.C. 154(b) by 306 days.

(21) Appl. No.: 14/259,514

(22) Filed: Apr. 23, 2014

(65) Prior Publication Data
US 2015/0264255 A1    Sep. 17, 2015

(30) Foreign Application Priority Data

Mar. 11, 2014 (IN) .......................... 1258/CHE/2014

(51) Int. Cl.
| | |
|---|---|
| *H04N 5/33* | (2006.01) |
| *H04N 5/232* | (2006.01) |
| *H04N 1/32* | (2006.01) |
| *G06T 7/60* | (2006.01) |

(52) U.S. Cl.
CPC .......... *H04N 5/23222* (2013.01); *G06T 7/608* (2013.01); *H04N 1/32272* (2013.01); *G06T 2207/20104* (2013.01)

(58) Field of Classification Search
IPC ................................................ H04N 5/23222
See application file for complete search history.

(56) References Cited

U.S. PATENT DOCUMENTS

| | | | | |
|---|---|---|---|---|
| 6,674,905 B1* | 1/2004 | Matsugu | ............... | G06T 7/0081 382/181 |
| 2006/0242418 A1* | 10/2006 | Willamowski | ........ | G06T 1/0071 713/176 |
| 2011/0313653 A1* | 12/2011 | Lindner | ............. | G01C 21/3632 701/523 |
| 2012/0189178 A1* | 7/2012 | Seong | ................... | G06T 11/008 382/128 |

* cited by examiner

*Primary Examiner* — Tracy Y Li
(74) *Attorney, Agent, or Firm* — LeClairRyan, a Professional Corporation

(57) ABSTRACT

Embodiments of the present disclosure provide a method for guiding a user to capture an image of a target object using an image capturing device. In an embodiment, the method of the present disclosure comprises determining a bounding area for image to be captured and capturing at least one frame of the image upon detecting image to be inside the bounding area. Then, the target object in captured at least one frame is segmented by separating the target object from the rest of the image. Further, at least one of symmetry and self-similarity of the segmented target object is determined. In addition, at least one image parameter is determined by a sensor. The method then provides inputs for guiding user to capture a final image of the target object, based on at least one of determined symmetry, self-similarity, and at least one image parameter.

18 Claims, 6 Drawing Sheets

METHOD AND A GUIDED IMAGING UNIT FOR GUIDING A USER TO CAPTURE AN IMAGE

This application claims the benefit of Indian Patent Application Filing No. 1258/CHE/2014, filed Mar. 11, 2014, which is hereby incorporated by reference in its entirety.

FIELD OF THE INVENTION

The present disclosure relates to image processing. In particular, embodiments of present disclosure include a method and a guided imaging unit for guiding a user to capture an image.

BACKGROUND OF THE INVENTION

With the convergence of technologies in computing, communication, mobile devices and camera, variety of applications requiring controlled and consistent imaging like photography and videography for a definitive purpose have been enabled. With rapid advancements in digital technology, relatively common user can now buy and operate equipment that was previously restricted to professional users. Whilst the cheaper equipment is capable of relatively high recording quality, often imaging by common user may still be of relatively low quality, due to lack of experience and knowledge on the part of the common user. Today, photos, videos are used in many business processes and requirements where the control is handed over to the users. This has resulted in better experience for the users and huge reduction on overheads for enterprises.

Mostly, the photos, videos with user annotations are very useful for definitive purposes such as event/incident recording, situation documentation, object recognition and its condition assessment, user/system authentication, image based information retrieval etc. However, specific usage of video and photos in many processes require to meet certain level of quality of images for the specified purposes. Further, there are cases where some or all of the requirements to meet specific usage as needed by the process are not communicated explicitly but remain as implicit requirements.

Many times imaging by a normal process taken by a common user may not meet the expected requirements or purpose of the end application. This may be due to inconsistency, non-repeatability, loss of vital information from view point, resolution, focus, field of view, color/hue, lighting etc. Also, the quality of images taken by a common user is directly impacted by the knowledge and ability that the user brings to the task of capturing the image.

Few conventional systems provide assistance to use in capturing images. However, the systems rely on prior reference such as image, templates or stencil marking for taking controlled photography for a specific purpose. Therefore, the above-mentioned problem exists in the field of guided photography.

SUMMARY OF THE INVENTION

Embodiments and aspects of the disclosure are described in detail herein and are considered a part of the claimed disclosure.

Disclosed herein is a computer implemented method for guiding a user to capture an image of a target object using an image capturing device. The method comprises determining a bounding area for the image to be captured. In an embodiment, the bounding area is a template for guiding the user to identify target object with self-similarity features. Then, at least one frame of the image is captured once the image is found to be inside the bounding area. The target object in the captured at least one frame is segmented by separating the target object from the rest of the image. Then, the method determines at least one of symmetry and self-similarity of the segmented target object. Additionally, at least one image parameter is also determined by a sensor. Finally, one or more inputs relating to the image are provided for guiding the user to capture a final image of the target object. The inputs are based on at least one of the determined symmetry, the determined self-similarity, and the at least one image parameter.

In an aspect of the present disclosure, a guided imaging unit for guiding a user to capture an image of a target object provided. The guided imaging unit comprises at least one processor, a sensor for sensing at least one image parameter and a memory storing instructions executable by the at least one processor. On execution of the instructions, the at least one processor determines a bounding area for the image to be captured, captures at least one frame of the image upon detecting the image to be inside the bounding area, segments the target object in the captured at least one frame by separating the target object from the rest of the image, determines at least one of symmetry and self-similarity of the segmented target object, determines at least one image parameter using the sensor, and provides one or more inputs, based on at least one of the determined symmetry, the determined self-similarity, and the at least one image parameter, for guiding the user to capture the final image.

In another aspect of the present disclosure, a non-transitory computer readable medium including instructions stored thereon is provided. The instructions when processed by at least one processor cause a guided imaging unit to perform the acts of determining a bounding area for the image to be captured, capturing at least one frame of the image upon detecting the image to be inside the bounding area, segmenting the target object in the captured at least one frame by separating the target object from the rest of the image, determining at least one of symmetry and self-similarity of the segmented target object, determining at least one image parameter by a sensor, and providing one or more inputs, based on at least one of the determined symmetry, the determined self-similarity, and the at least one image parameter, for guiding the user to capture a final image of the target object.

The foregoing summary is illustrative only and is not intended to be in any way limiting. In addition to the illustrative aspects and features described above, further aspects, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure relates to a method for guiding a user to capture an image of a target object using an image capturing device. In an embodiment, the method can be implemented by a standalone device, i.e. the image capturing device. In an exemplary embodiment, the method could be implemented using a network connected image capturing device and a server.

Figure 1A:
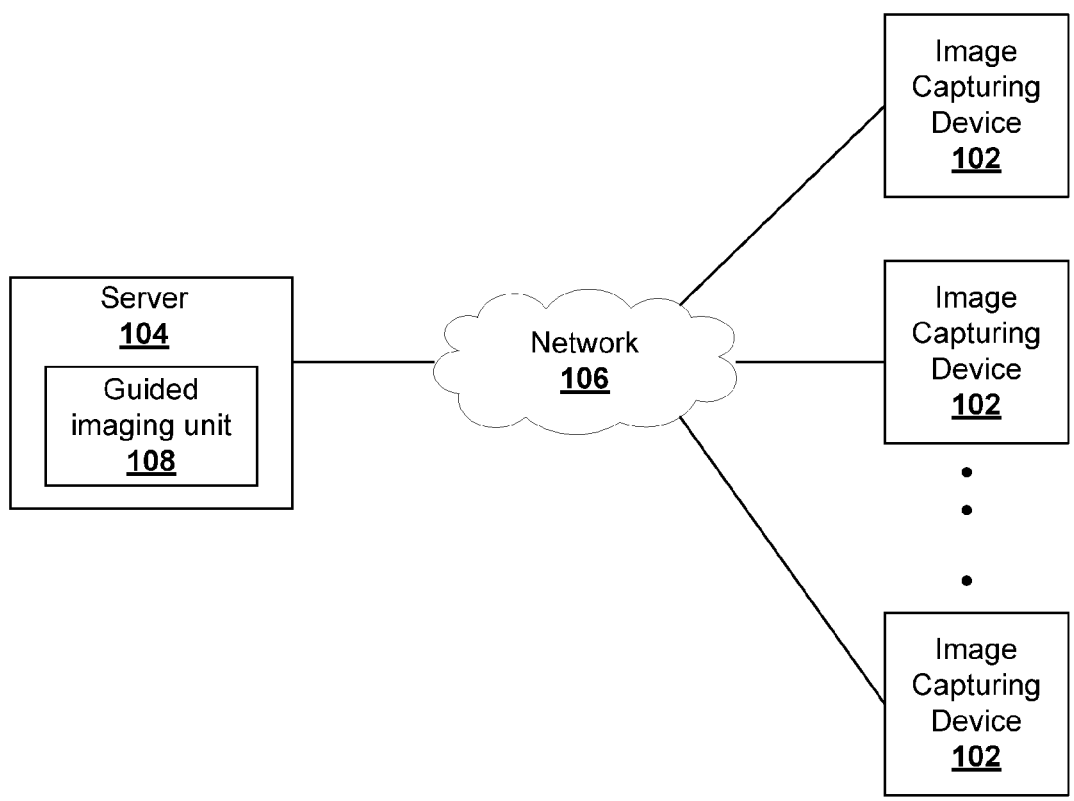
FIG. 1A illustrates a network environment for guiding a user to capture an image of a target object in accordance with some exemplary embodiments of the present disclosure.

FIG. 1A illustrates a network environment for guiding a user to capture an image of a target object in accordance with some exemplary embodiments of the present disclosure.

The environment comprises an image capturing device 102 connected to a server 104 through a communication network 106. In an exemplary embodiment plurality of the image capturing devices 102 may be connected to the server 104. The image capturing device 102 may be a digital camera, although it will be understood that other electronic devices will also benefit from the method of the present disclosure. Other electronic devices with image capturing capability include, but are not limited to, a mobile phone, Personal Digital Assistant (PDA), laptop, computer, video cameras, three Dimensional (3D) cameras, mobile phones, and surveillance cameras are also contemplated.

The server 104 comprises a guided imaging unit 108 to assist the user in capturing images. In this environment, the images captured by the image capturing device 102 are transmitted to the server 104 through the network 106. The processing of the image is performed at the server 104 and the server 104 transmits guidance to the image capturing device 102, which helps the user to capture images based on the requirements.

It will be understood by one skilled in the art that connections to the network 106 may be wired, wireless or any combination thereof. For example, the plurality of image capturing device 102 maybe connected to server 104 through wireless local area network (WLAN) technologies (e.g., Wi-Fi, 3G, Long Term Evolution (LTE)) or through a physical network connection to a computer network router or switch (e.g., Ethernet). In some embodiments, the image capturing device 102 may be connected to network 106 through mobile cellular networks.

Figure 1B:
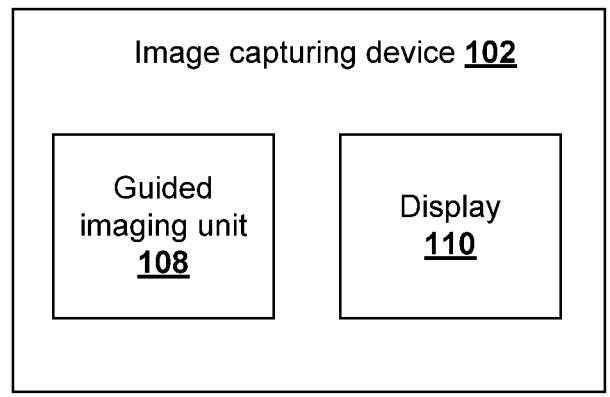
FIG. 1B illustrates a block diagram of an image capturing device to capture an image of a target object in accordance with some embodiments of the present disclosure.

FIG. 1B illustrates a block diagram of an image capturing device to capture an image of a target object in accordance with some embodiments of the present disclosure. In case the image capturing device 102 is used as a standalone device, then the guided imaging unit 108 is implemented in the image capturing device 102 itself. The image capturing device 102 also comprises a display 110 on which the image to be focused and captured images are displayed to the user. Also, guidance to the user for capturing images may be displayed on the display 110. In an embodiment, the display 110 can be a touch screen display.

In an embodiment, a user initiates an imaging application on the image capturing device 102. Then, the targeted objects focused by the user are displayed on the display 110. The guided imaging unit 108 processes the image comprising the targeted objects to guide the user to capture images. First, the guided imaging unit 108 determines a bounding area for the image to be captured. The guided imaging unit 108 may interact with the user to determine the type of bounding area to be used for the image. The guided imaging unit 108 then instructs the user to settle the target object inside the bounding area. Once the image is settled within the bounding area, the image capturing device 102 captures at least one frame of the image. The guided imaging unit 108 then segments the target object in the captured at least one frame by separating the target object from the rest of the image. This helps in focusing on the target object to be captured and omitting the details in the background. Once the segmented object is obtained, the guided imaging unit 108 determines at least one of symmetry and self-similarity of the segmented target object. Also, the guided imaging unit 108 uses one or more sensors to determine at least one image parameter. The guided imaging unit 108 then provides one or more inputs, based on at least one of the determined symmetry, the determined self-similarity, and the at least one image parameter, for guiding the user to capture the final image.

Figure 2:
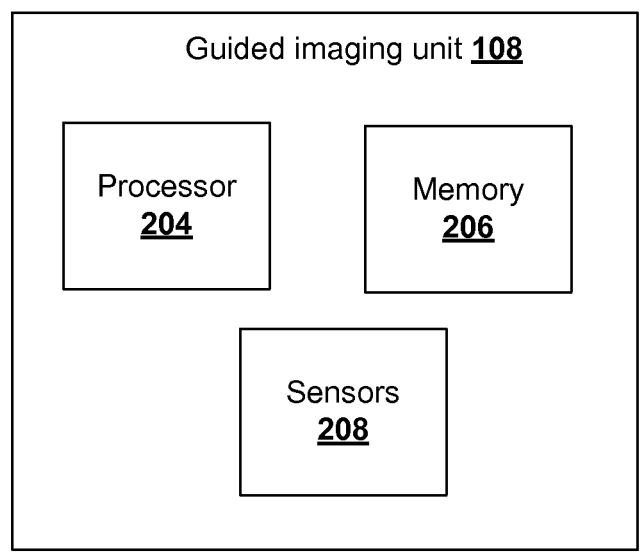
FIG. 2 illustrates a block diagram of a guided imaging unit for guiding a user to capture an image of a target object in accordance with some embodiments of the present disclosure.

FIG. 2 illustrates a block diagram of a guided imaging unit 108 for guiding a user to capture an image of a target object in accordance with some embodiments of the present disclosure. The guided imaging unit 108 can be implemented on the image capturing device 102 itself. In such a case, the image capturing device 102 shall process an initially captured image and provide guidance to user for capturing one or more final images. In another embodiment, the guided imaging unit 108 can be a part of the server 104. In this case, the image capturing device 102 transmits the initially captured images to server 104. The processing of the image occurs at the server 104, which then transmits guidance for capturing images the image capturing device 102.

The guided imaging unit 108 comprises a processor 204, a memory 206 and sensors 208. According to some examples, several interfaces are provided for interconnecting and/or communicatively coupling elements of the guided imaging unit 108 and elements of the image capturing device 102. For example, the interface may allow for processor to communicatively couple to sensor 208, display 110, camera, and memory 206. Interface, for example, may allow hardware and/or firmware elements of guided imaging unit 108 to communicatively couple together, e.g., via a system bus or other type of internal communication channel. The processor 204 performs the instructions stored in the memory 206 to provide assistance to user in capturing images. The one or more sensors 208 provide at least one image parameters. The image parameters may include orientation and/or position of the image capturing device 102, direction with respect to a frame of reference of the image capturing device 102, motion detection, angle of slope, amount/intensity of light, distance between the image capturing device 102 and the target object to be captured. These image parameters help to build situation awareness of the user and the image capturing device 102. The sensors 208 may include, but are not limited to, gyroscope, compass, 3-axis accelerometer, inclinometer, light meter, Infrared ranger and ultrasonic ranger. In some embodiments, the sensors 208 are configured inside the guided imaging unit 108. In some embodiments, some of the sensors 208 are configured in the image capturing device 102.

The memory 206 may be configured to store information including, but not limited to, plurality of bounding area, one or more captured images and instructions for providing guidance to user for capturing the images. According to some examples, the memory 206 may be implemented as a volatile memory device utilized by various elements of image capturing device 102 (e.g., as off-chip memory). For these implementations, the memory 206 may include, but is not limited to, random access memory (RAM), dynamic random access memory (DRAM) or static RAM (SRAM). In some embodiment, the memory 206 may include any of a Universal Serial Bus (USB) memory of various capacities, a Compact Flash (CF) memory, an Secure Digital (SD) memory, a mini SD memory, an Extreme Digital (XD) memory, a memory stick, a memory stick duo, an Smart Media Cards (SMC) memory, an Multimedia card (MMC) memory, and an Reduced-Size Multimedia Card (RS-MMC), for example, noting that alternatives are equally available. Similarly, the memory 206 may be of an internal type included in an inner construction of a corresponding image capturing device 102, or an external type disposed remote from such an image capturing device 102. Again, the memory 206 may support the above-mentioned memory types as well as any type of memory that is likely to be developed and appear in the near future, such as phase change random access memories (PRAMs), ferroelectric random access memories (FRAMs), and magnetic random access memories (MRAMs), for example.

Figure 3A:
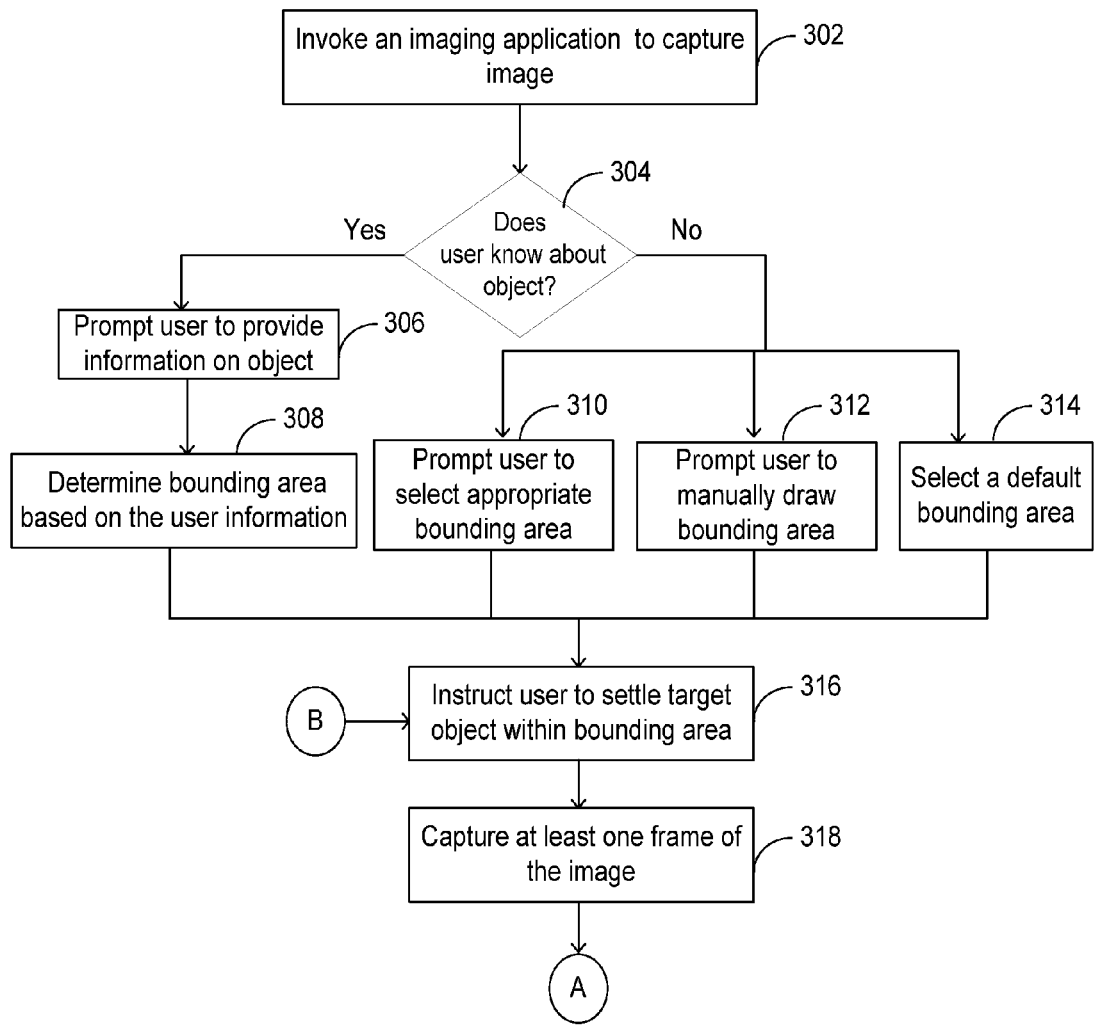
FIGS. 3A and 3B show a flowchart illustrating a method for guiding a user to capture an image of a target object in accordance with an embodiment of the present disclosure.
Figure 3B:
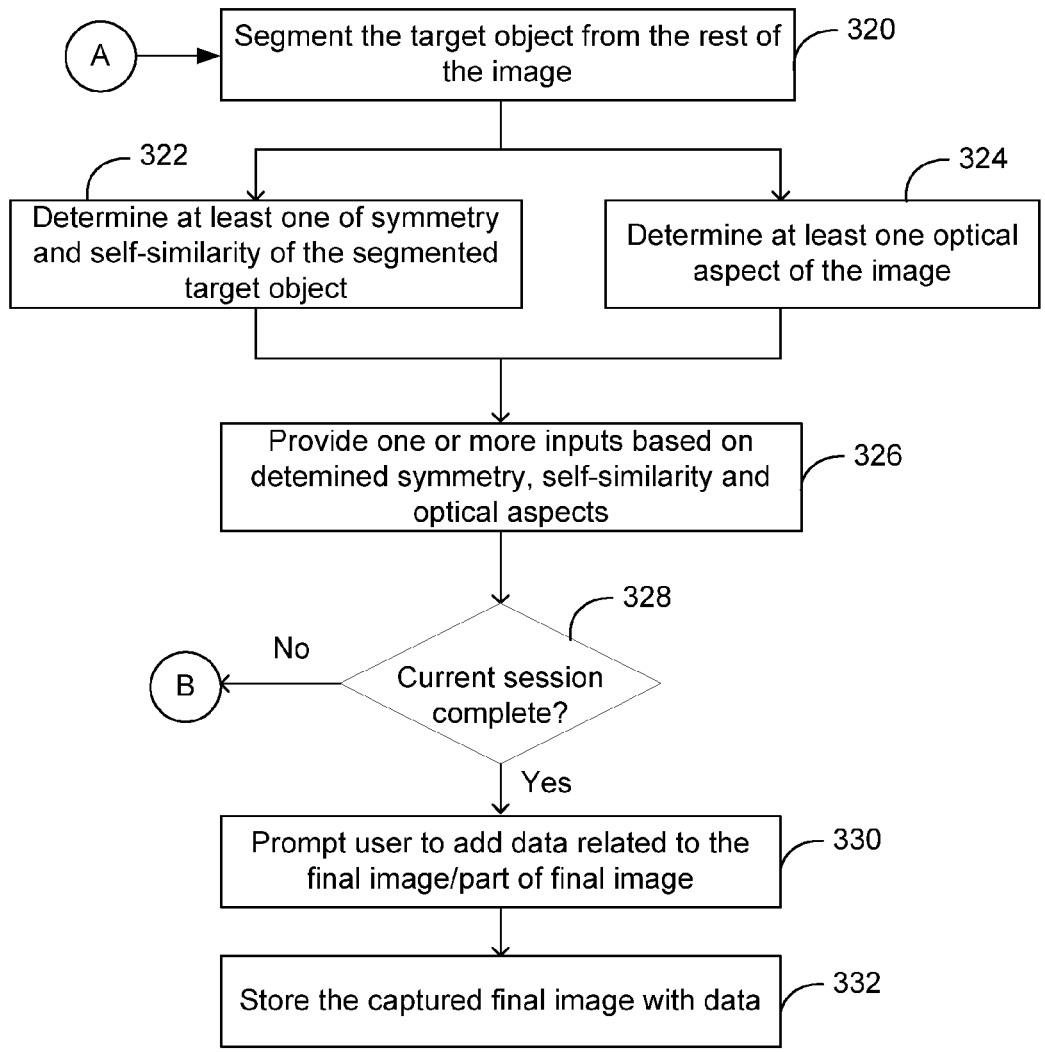

FIGS. 3A and 3B shows a flowchart illustrating a method for guiding a user to capture an image of a target object in accordance with an embodiment of the present disclosure.

Figure 4A:
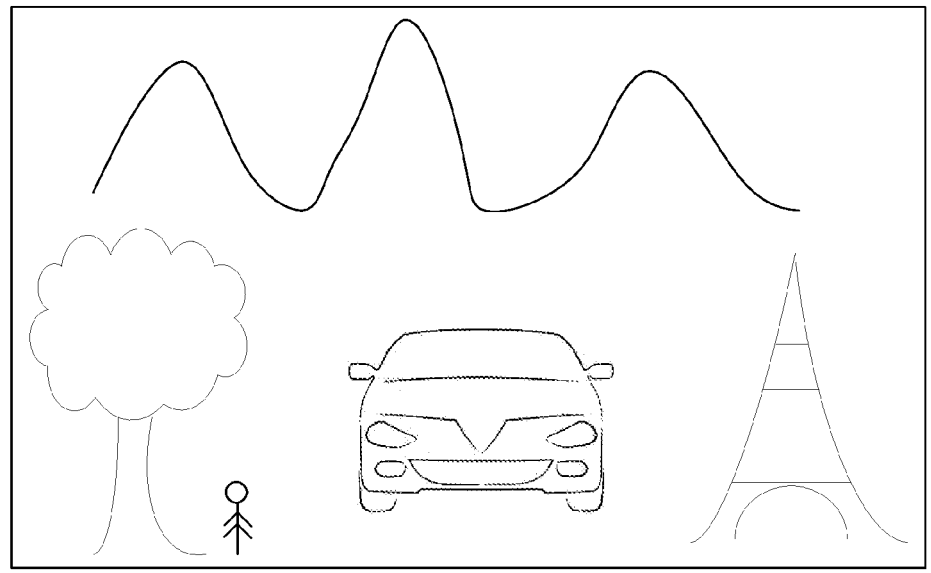
FIGS. 4A and 4B illustrate exemplary pictorial representations of image displayed in image capturing device in accordance with some embodiments of the present disclosure.

The method comprises invoking an imaging application by a user on the image capturing device 102 at step 302. The imaging application is invoked to capture images of target object which may include, but is not limited to, an artifact, person, and vehicle that needs to be imaged for a specific purpose. Further, the user is responsible to operate the image capturing device 102 based on the guidance provided, and capture images of the target object. Once the imaging application is invoked, user focusses on the target object to be captured. An exemplary image focused by the user is illustrated in FIG. 4A. In an embodiment, the image is displayed on the display 110 of the image capturing device 102. Then, the processor 204 configured in the guided image unit 108 determines a bounding area for the image to be captured. In some exemplary embodiment, different views of the target object may have to be captured. Therefore, the initial guidance to the user is to provide a bounding area for the target object. This helps in identifying the desired region for extracting the features and which needs to be focused while capturing the image. The bounding area can be of any shape and/or size. The shapes may include, but are not limited to square, rectangle, circle, elliptical, trapezium, triangle or any other user defined arbitrary closed curve etc. In an embodiment, the bounding area may be two-dimensional or three dimensional.

Figure 4B:
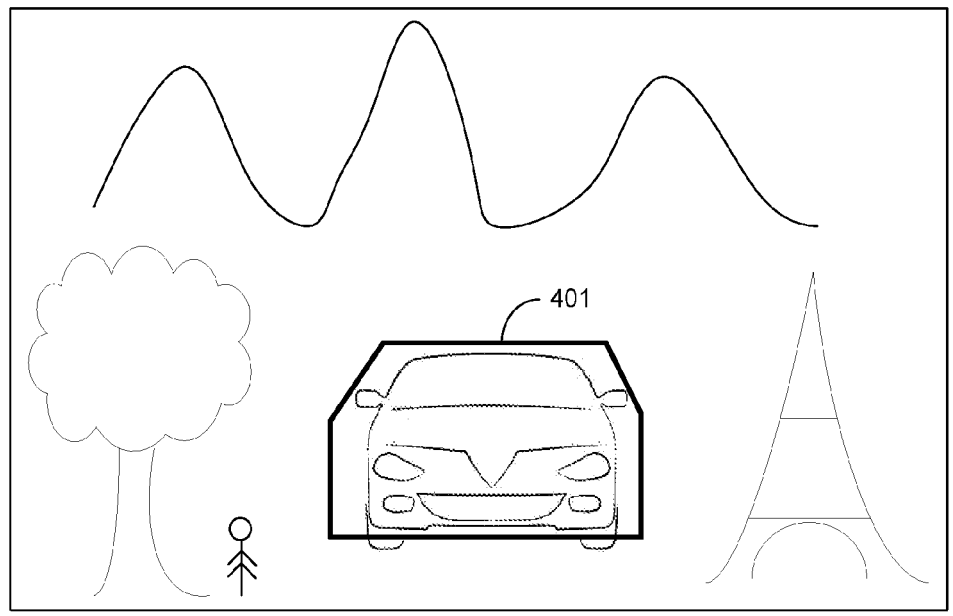

In some embodiments, determining a bounding area for the target object may be achieved in different ways. Firstly, the guided imaging unit 108 prompts the user to ask if the user knows about the target object at step 304. If the user knows about the target object, then the guided imaging unit 108 prompts the user again to provide more information of the target object. The user provides information about the target object through a user interface of the image capturing device 102 at step 306. The information of the target object may include attributes like type of object, genre of object, shape of object, size of object etc. The information may be further classified as generic symmetric descriptors or non-generic symmetric descriptors. The generic symmetric descriptors may include classes of object like, for cars, the generic symmetric descriptors may be sedan, hatchback etc. The non-generic symmetric descriptors are related to specific unique object, and may vary according to chosen object. The guided imaging unit 108 then determines a bounding area from the stored plurality of stored bounding areas to match the attributes provided by the user at step 308. The guided imaging unit 108 stores the plurality of bounding areas in a memory (not shown) of the server 104, when the method is implemented in a networked environment. In an embodiment, the guided imaging unit 108 stores the plurality of bounding areas in the memory 206 of the guided imaging unit 108, when the method is implemented on a standalone image capturing device 102. Secondly, as an alternative to first one, if the user does not know about the target object, then the bounding area may be determined using one of the methods below. In an embodiment, the image capturing device 102 displays a plurality of bounding areas on the display 110 and prompts the user to select an appropriate bounding area at step 310. The user may then select an appropriate bounding area matching the target object. Lastly, in an exemplary embodiment, the guided imaging unit 108 prompts the user to manually draw the bounding area around the target object at step 312. The user can draw the bounding area around the target object using an input unit such as stylus or finger etc. on the display 110 of the image capturing device 102. In some embodiments, the user can use cursor keys on the user interface such as keyboard. Using the cursor keys, the user can mark points for a shape like polygon or fit a curve across the points defined using certain functional menus. The new shape of the bounding area drawn by the user may be saved in the memory 206 of the guided imaging unit 108 for future use. In another exemplary embodiment, the guided imaging unit 108 may select a default bounding area for the target object at step 314. FIG. 4B illustrates an exemplary image with a bounding area 401 around the target object of the image. In the illustrated figure, it is understood that the user wishes to capture image of the car.

Once, the bounding area for the target object is determined, the guided imaging unit 108 instructs the user to settle the target object inside the bounding area at step 316. The image capturing device 102 captures at least one frame of the image at step 318. In an embodiment, the multiple frames of the image are initial reference frames and they could be of lower resolution for faster processing.

Figure 5:
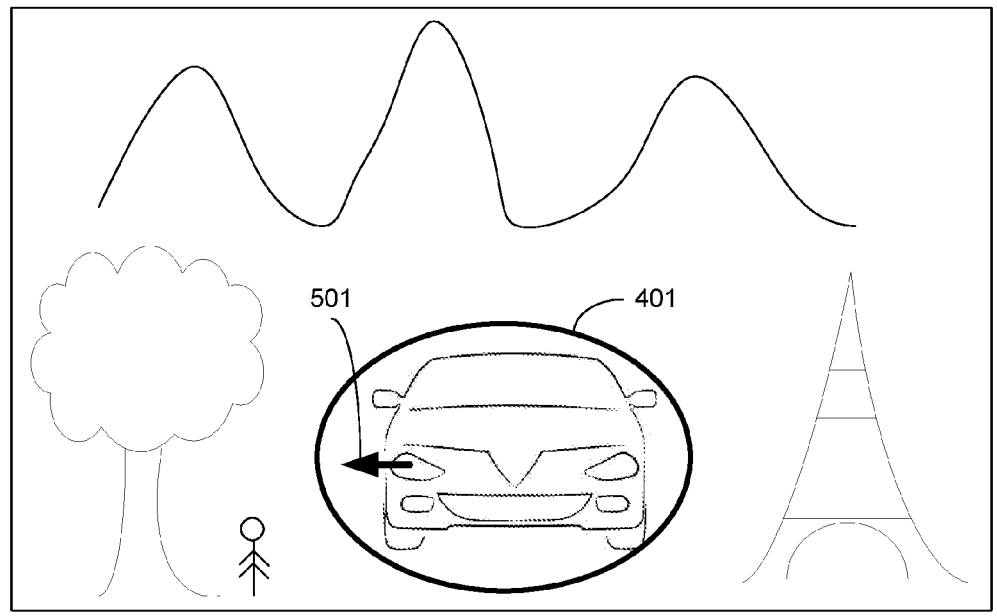
FIGS. 5 and 6 illustrate exemplary pictorial representations for guiding a user to capture an image of a target object in accordance with another some embodiments of the present disclosure.

In continuation to capturing the at least one frame, the guided imaging unit 108 segments the target object from the rest of the image which may include background etc. In an exemplary embodiment, one or more methods to segment the target object in focus may include, but are not limited to, Gaussian smoothing, unsharp mask, median filter, watershed, growcuts etc. A person skilled in the art would understand that any other known segmentation methods can be used with implementation of the present disclosure. The segmentation of the target object provides edges and other exterior boundaries of the object of interest. The guided imaging unit 108 passes the object boundaries to the user along with directions of movement of the image capturing device 102 to guide the user. FIG. 5 illustrates an exemplary pictorial representation for guiding a user to capture an image of a target object. The user is provided with a direction indicator 501, which guides the user to move the image capturing device 102 as indicated. The directions and object boundaries are displayed on display 110 of the image capturing device 102 as a reference for user. This provides suggestions so as to ensure that the required view of the target object is achieved.

Using the segmented object, the guided imaging unit 108 determines at least one of similarity features and symmetry properties of the segmented object at step 322. The symmetry analysis is performed on the segmented objected with self, either in horizontal or vertical axis. The symmetry analysis may also be performed with complementary side of the segmented object such as front and rear side, left and right sides of the object respectively. The symmetry analysis provides the measurements of the object in terms of its symmetric properties with respect to the area coverage, confidence levels and whether it has qualified for further processing by using a pre-configured threshold level of similarity. In some embodiments, the pre-configured threshold level of similarity may be set by user or by the guided imaging unit 108 based on learning methods and past histories. The guided imaging unit 108 determines the similarity features and symmetric properties using at least one of fast reflectional symmetry detection, intensity and edge-based symmetry detection and symmetry detection using gradient information etc. The present disclosure may be configured to apply other symmetry/self-similarity analysis techniques as well ambit variations as will be understood by those skilled in the art Also, the guided imaging unit 108 determines at least one image parameter using one or more sensors 208 at step 324. The image parameters may include orientation and/or position of the image capturing device 102, direction with respect to a frame of reference of the image capturing device 102, motion detection, angle of slope, amount/intensity of light, distance between the image capturing device 102 and the target object to be captured. Based on the determined similarity features, symmetric properties and at least one image parameter, the guided imaging unit 108 provides one or more inputs which helps the user in capturing a final image of the target object at step 326. The guided imaging unit 108 provides dynamic guidance in real time to the users in terms of 10 degrees of freedom including, but not limited to, pitch, yaw, roll and zoom etc. The inputs provided to the user may be in a format, including, but not limited to, text, images, audio, video, and vibration in different patterns and frequencies. In an embodiment, the inputs may be a visual overlay using augmented reality on display, augmented audio via a Bluetooth or speaker, or using motor actuation by vibrating in different patterns and frequencies for different cases. In an embodiment, the guidance for the user to capture images is based on at least one of user requirement data, relative position of the target object with respect to the image capturing device 102, environmental conditions, capabilities of the image capturing device 102, user preferences, user behavioral history, met and unmet requirements so far, images received in the photography session so far, user markings on the received photographs and descriptions etc.

Figure 6:
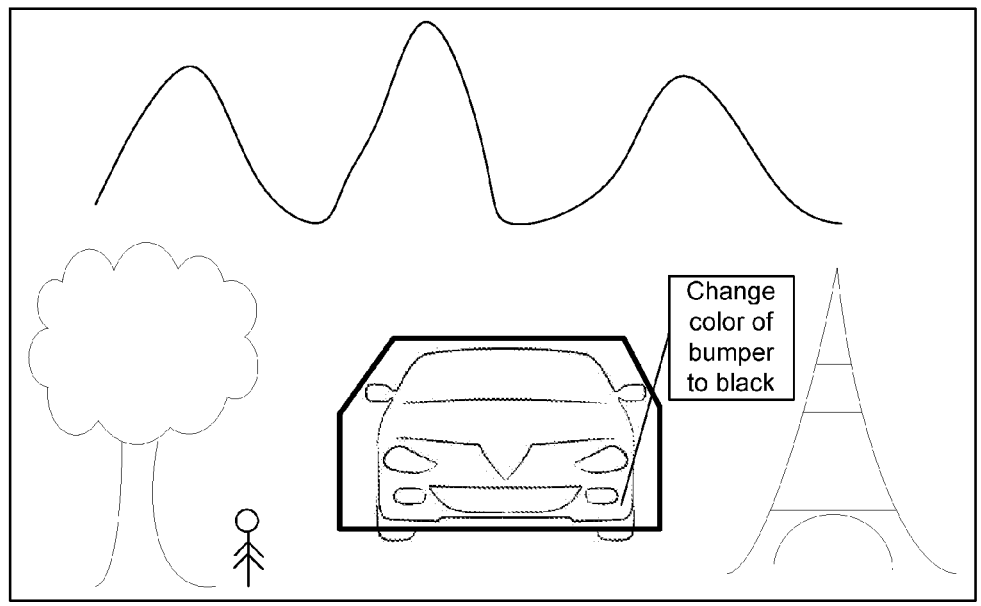

Then, the guided imaging unit 108 prompts the user to ask if the current session of capturing final image is complete at step 328. If the current session is not complete, then the guided imaging unit 108 again instructs the user to settle the target object within the bounding area at step 316. All the consecutive steps are again followed to provide one or more inputs to the user. In the alternative, if the current session is complete, then guided imaging unit 108 prompts the user to add data related to the image or a part of the image. Then guided imaging unit 108 then stores the data related to the final image in the memory 206 of the guided imaging unit 108 at step 330. A sample image with user markings is illustrated in FIG. 6. For example, the user provides additional information saying "Change the colour of bumper to black". In an exemplary embodiment, the properties of the user markings could be used to denote additional meaning. The properties of the marking may include, but is not limited to, colour of marking line, thickness of the marking line, colour of the marking area, pressure applied while marking, etc. For example, red colour marking could mean that the marked part of the image violates the local laws. The data may be in a format including, but not limited to, voice, video, audio, hyperlink image, barcode, Quick Response (QR) code, reference images, digital hand sketches, markings and software program. The data which may be added by user includes description of the target object, location, people in the image, time/date information, and/or any information associated with image.

Finally, the guided imaging unit 108 stores the captured final image along with the user provided data in the memory 206. In an embodiment, the captured final image and related data may be stored in an external memory unit. The external memory unit may be a local memory unit or may be located at a remote location and connected through the network 106. In addition, based on the requirement of the user, the guided imaging unit 108 may encrypt and/or watermark the image and related data for security. In an embodiment, the image is encrypted or watermarked with a unique identification so that that image may not be misused in the image capturing device 102 or in the network 106.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor or a processor capable of processing and executing the queries. The processor may be implemented as a central processing unit (CPU) for guided imaging unit 108. The CPU may include one or more processing units having one or more processor cores or having any number of processors having any number of processor cores. CPU may include any type of processing unit, such as, for example, a multi-processing unit, a reduced instruction set computer (RISC), a processor having a pipeline, a complex instruction set computer (CISC), digital signal processor (DSP), and so forth. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all of the items are mutually exclusive, unless expressly specified otherwise. Moreover, the terms "first," "second," "third," and so forth, are used merely as labels, and are not intended to impose numerical requirements on their objects.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3A and 3B show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processor or by distributed processing units.

Additionally, advantages of present disclosure are illustrated herein.

In an embodiment, the present disclosure provides a method which utilizes the inherent self-similarity of the object to provide guidance to user for capturing images. This method eliminates the need for the reference image in guidance of users to take purpose driven photographs.

In an embodiment of the present disclosure, the method reduces the computation complexity and time for processing the image.

Finally, the language used in the specification has been principally selected for readability and instructional purposes, and it may not have been selected to delineate or circumscribe the inventive subject matter.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 102 | Image capturing device |
| 104 | Server |
| 106 | Network |
| 108 | Guided imaging unit |
| 110 | Display |
| 204 | Processor |
| 206 | Memory |
| 208 | Sensors |

What is claimed is:

1. A method for guiding a user to capture an image of a target object, the method comprising:
   determining, by an image capturing device, a bounding area for the image to be captured;
   capturing, by the image capturing device, at least one frame of the image upon detecting the image to be inside the determined bounding area;
   segmenting, by the image capturing device, the target object in the captured at least one frame by separating the target object from the rest of the image;
   determining, by the image capturing device, symmetry and self-similarity of the segmented target object;
   determining, by the image capturing device, at least one image parameter; and
   providing, by the image capturing device, one or more inputs based on the determined symmetry, the determined self-similarity, and the at least one image parameter of the image, for guiding the user to capture a final image of the target object.

2. The method as claimed in claim 1, wherein the determining of the bounding area for the image to be captured further comprises:
   prompting, by the image capturing device, the user to provide attributes of the image;
   determining, by the image capturing device, the bounding area based on the attributes;
   providing, by the image capturing device, a plurality of bounding areas to the user for selection;
   determining, by the image capturing device, the bounding area based on the selection of user; and
   prompting, by the image capturing device, the user to manually draw the bounding area around the image.

3. The method as claimed in claim 1 further comprising:
   providing, by the image capturing device, a direction indicator indicating direction for moving the image capturing device;
   storing, by the image capturing device, data related to at least one of the final image and a part of the final image provided by the user; and
   watermarking and encrypting, by the image capturing device, the final image with a unique identifier.

4. The method as claimed in claim 3, wherein the data is at least one of voice, video, audio, hyperlink image, barcode, Quick Response (QR) code, reference images, digital hand sketches, markings or software program.

5. The method as claimed in claim 1, wherein:
   the one or more inputs are provided in a format comprising one or more of a text, an image, an audio, a video or vibration in different patterns and frequencies; and
   wherein one or more aspects comprise one or more of an orientation, a direction, plurality of slope angles, amount of light and distance of the image capturing device.

6. The method as claimed in claim 1, wherein the symmetry of the segmented object is determined by identifying, by the image capturing device, at least one of vertical axis, horizontal axis or complementary side of the segmented object.

7. An image capturing device comprising:
   a processor;
   a memory, wherein the memory coupled to the processor which are configured to execute programmed instructions stored in the memory comprising:
      determining a bounding area for the image to be captured;
      capturing at least one frame of the image upon detecting the image to be inside the determined bounding area;
      segmenting the target object in the captured at least one frame by separating the target object from the rest of the image;
      determining symmetry and self-similarity of the segmented target object;
      determining at least one image parameter; and
      providing one or more inputs based on the determined symmetry, the determined self-similarity, and the at least one image parameter of the image, for guiding the user to capture a final image of the target object.

8. The device as set forth in claim 7 wherein the processor is further configured to execute programmed instructions stored in the memory for the determining of the bounding area for the image to be captured further comprises:
   prompting the user to provide attributes of the image;
   determining the bounding area based on the attributes;
   providing a plurality of bounding areas to the user for selection;
   determining the bounding area based on the selection of user; and
   prompting the user to manually draw the bounding area around the image.

9. The device as set forth in claim 7 wherein the processor is further configured to execute programmed instructions stored in the memory further comprising:
   providing a direction indicator indicating direction for moving the image capturing device;
   storing data related to at least one of the final image and a part of the final image provided by the user; and
   watermarking and encrypting the final image with a unique identifier.

10. The device as set forth in claim 9 wherein the data is at least one of voice, video, audio, hyperlink image, barcode, Quick Response (QR) code, reference images, digital hand sketches, markings or software program.

11. The device as set forth in claim 7 wherein:
    the one or more inputs are provided in a format comprising one or more of a text, an image, an audio, a video or vibration in different patterns and frequencies; and
    wherein one or more aspects comprise one or more of an orientation, a direction, plurality of slope angles, amount of light and distance of the image capturing device.

12. The device as set forth in claim 7 wherein the processor is further configured to execute programmed instructions stored in the memory for the symmetry of the segmented object is determined by identifying at least one of vertical axis, horizontal axis or complementary side of the segmented object.

13. A non-transitory computer readable medium having stored thereon instructions for guiding a user to capture an image of a target object executable code which when executed by a processor, causes the processor to perform steps comprising:
    determining a bounding area for the image to be captured;
    capturing at least one frame of the image upon detecting the image to be inside the determined bounding area;
    segmenting the target object in the captured at least one frame by separating the target object from the rest of the image;
    determining symmetry and self-similarity of the segmented target object;
    determining at least one image parameter; and providing one or more inputs based on the determined symmetry, the determined self-similarity, and the at least one image parameter of the image, for guiding the user to capture a final image of the target object.

14. The medium as set forth in claim 13 wherein the determining of the bounding area for the image to be captured further comprises:
   prompting the user to provide attributes of the image;
   determining the bounding area based on the attributes;
   providing a plurality of bounding areas to the user for selection;
   determining the bounding area based on the selection of user; and
   prompting the user to manually draw the bounding area around the image.

15. The medium as set forth in claim 13 further comprising:
   providing a direction indicator indicating direction for moving the image capturing device;
   storing data related to at least one of the final image and a part of the final image provided by the user; and
   watermarking and encrypting the final image with a unique identifier.

16. The medium as set forth in claim 15 wherein the data is at least one of voice, video, audio, hyperlink image, barcode, Quick Response (QR) code, reference images, digital hand sketches, markings or software program.

17. The medium as set forth in claim 13 wherein:
   the one or more inputs are provided in a format comprising one or more of a text, an image, an audio, a video or vibration in different patterns and frequencies; and
   wherein one or more aspects comprise one or more of an orientation, a direction, plurality of slope angles, amount of light and distance of the image capturing device.

18. The medium as set forth in claim 13 wherein the symmetry of the segmented object is determined by identifying at least one of vertical axis, horizontal axis or complementary side of the segmented object.

* * * * *